(12) United States Patent
Williams et al.

(10) Patent No.: US 12,359,373 B2
(45) Date of Patent: Jul. 15, 2025

(54) POLYVINYL ALCOHOL COATED CELLULOSIC PRODUCTS

(71) Applicant: Aquapak IP Limited, Birmingham (GB)

(72) Inventors: John Williams, Chirbury (GB); Sian Griffiths, Conwy (GB); Robert Ashworth, Conwy (GB); David Lee Meadows, Hartpury (GB)

(73) Assignee: Aquapak IP Limited, Birmingham (GB)

( * ) Notice: Subject to any disclaimer, the term of this patent is extended or adjusted under 35 U.S.C. 154(b) by 442 days.

(21) Appl. No.: 17/446,072

(22) Filed: Aug. 26, 2021

(65) Prior Publication Data

US 2022/0064860 A1    Mar. 3, 2022

(30) Foreign Application Priority Data

Aug. 26, 2020  (EP) ..................... 20192950

(51) Int. Cl.
| | |
|---|---|
| *D21H 19/20* | (2006.01) |
| *C09D 7/48* | (2018.01) |
| *C09D 7/63* | (2018.01) |
| *C09D 129/04* | (2006.01) |
| *D21H 23/46* | (2006.01) |
| *C08K 5/06* | (2006.01) |

(Continued)

(52) U.S. Cl.
CPC ............. *D21H 19/20* (2013.01); *C09D 7/48* (2018.01); *C09D 7/63* (2018.01); *C09D 129/04* (2013.01); *D21H 23/46* (2013.01); *C08K 5/06* (2013.01); *C08K 5/098* (2013.01); *C08K 5/3412* (2013.01); *C08K 2201/014* (2013.01)

(58) Field of Classification Search
CPC .......... D21H 19/20; D21H 23/46; C09D 7/48; C09D 7/63; C09D 129/04; B32C 27/30; C08K 5/20
USPC ........................................................ 162/135
See application file for complete search history.

(56) References Cited

U.S. PATENT DOCUMENTS

| | | | | |
|---|---|---|---|---|
| 5,714,095 A | * | 2/1998 | Henrio ................. | C08K 5/07 524/400 |
| 5,912,058 A | * | 6/1999 | Takahashi ........... | B65D 65/466 428/34.3 |

(Continued)

FOREIGN PATENT DOCUMENTS

| | | |
|---|---|---|
| EP | 3936555 A1 | 1/2022 |
| JP | H02191799 A | 7/1990 |

(Continued)

OTHER PUBLICATIONS

JP 2004 262106, Kawashima Yasushi, Sep. 2004, machine translation.*

(Continued)

*Primary Examiner* — Dennis R Cordray

(57) ABSTRACT

A method of manufacture of a coated material is provided. A polyvinyl alcohol polymer, where the polyvinyl alcohol polymer has a degree of hydrolysis of 90% or greater and a melting point in the range of 180° C. to 225° C. is melted on a cellulosic substrate and extruded to form a molten polyvinyl alcohol polymeric film which is then applied directly to the surface of the substrate to form the coated material.

18 Claims, 2 Drawing Sheets

(51) Int. Cl.
*C08K 5/098* (2006.01)
*C08K 5/3412* (2006.01)

(56) References Cited

U.S. PATENT DOCUMENTS

| | | | | |
|---|---|---|---|---|
| 5,993,953 | A * | 11/1999 | Takahashi | B65D 81/052 |
| | | | | 428/311.71 |
| 2012/0122681 | A1 * | 5/2012 | Le Vezouet | A01N 43/76 |
| | | | | 514/342 |
| 2018/0171559 | A1 * | 6/2018 | Hipps, Sr. | D21H 19/34 |

FOREIGN PATENT DOCUMENTS

| | | |
|---|---|---|
| JP | H08112884 A | 5/1996 |
| WO | 2016/046520 A1 | 3/2016 |
| WO | 2017/04636 A1 | 1/2017 |
| WO | 2017/046361 A1 | 3/2017 |

OTHER PUBLICATIONS

Polyvinyl Alcohol, Reference Standard, USPharmacopia, No Date< [online], retrieved from the Internet, [retrieved Mar. 8, 2025], <URL:https://doi.usp.org/USPNF/USPNF_M66990_06_01.html> (Year: 2025).*

* cited by examiner

POLYVINYL ALCOHOL COATED CELLULOSIC PRODUCTS

CROSS-REFERENCE TO RELATED APPLICATION(S)

This application claims priority to European Application Patent Serial No. 20192950.2, filed Aug. 26, 2020, the entire disclosure of which is hereby incorporated by reference.

TECHNICAL FIELD

This invention relates to coated cellulosic substrates, particularly but not exclusively to coated paper and articles made from coated paper, wherein the coating comprises polyvinyl alcohol. The coating may be applied to paper, board, cardboard, shaped packaging, containers and cartons, and other cellulosic products.

BACKGROUND

The difficulty or impossibility of recycling packaging, containers and the like composed of conventional polymers, for example polyolefins creates environmental problems. For example, magazines enclosed in polyethylene wrappers are often discarded or recycled with wastepaper. This had the disadvantage that equipment in a paper mill may become clogged by the polymeric wrappers. This has given rise to a desire to use paper and other cellulosic materials. However, one cannot use paper on commercial production lines for forming, filling and sealing packaging due to the relative lack of mechanical strength and difficulty in high speed sealing of paper.

Polyvinyl alcohol has been applied to paper substrates from solution or as an emulsion. However, the properties of the resultant coating restrict the use to a small number of applications. A relatively high coating weight may be required.

WO2017/046361 discloses a method for manufacture of plasticized polyvinyl alcohol having a degree of hydrolysis of 98 wt % or higher.

JP08112884 discloses manufacture of polyvinyl alcohol laminate by application of molten polyvinyl alcohol having a degree of saponification of 20% to 80%, under pressure to a moisture-permeable base.

JP02191799 discloses production of water-dispersable resin-laminated paper by melt extrusion of polyvinyl alcohol resin onto water-dispersable paper.

SUMMARY

Disclosed herein are implementations of

According to a first aspect of the present invention, there is provided a method of manufacture of a coated material comprising the steps of:
- providing a cellulosic substrate;
- melting a polyvinyl alcohol polymer, wherein the polyvinyl alcohol polymer has a degree of hydrolysis of 90% or greater; and a melting point in the range 180° C. to 225° C.;
- extruding the melted polyvinyl alcohol polymer to form a molten polyvinyl alcohol polymeric film;
- applying the molten film directly to a surface of the substrate; and
- allowing the film to solidify on the surface to form a coated material.

The molten film may be applied directly to the surface of the substrate without use of an adhesive or intermediate bonding layer. The plasticized polyvinyl alcohol coating may exhibit natural adhesion, avoiding the need for use of an adhesive to form a bond between adjacent sheets or for sealing a container.

The polymer employed in the present invention exhibits advantageous properties which facilitate formation of a stable molten film which has sufficient melt strength to be applied directly on to a cellulosic substrate. Polyvinyl alcohol crystallises rapidly. The melting point of the polymer is selected so that the temperature of the molten polymer when it contacts the substrate is above the glass transition temperature (Tg). The glass transition temperature of the polyvinyl alcohol polymer is in the region of 70° C. The temperature during extrusion and up to the point of contacting the cellulosic substrate surface using a conventional coating apparatus is controlled accordingly. The film of this invention may not form holes under the stress of extrusion conditions and is thermally stable so that degradation does not occur. Without wishing to be bound by theory, it is believed that the plasticiser and stabiliser additives allow the polymer to maintain a stable viscosity when above the glass transition temperature.

When conventional polyvinyl alcohol is melted and subjected to shear, the viscosity initially decreases but after a short period, typically 5 to 10 minutes, the viscosity increases and eventually the polymer degrades. This may be attributed to entanglement of the polymer chains.

When the plasticised polyvinyl alcohol polymer of the present invention is melted and subjected to shear, the viscosity continuously decreases as the shear rate increases. The reduced viscosity is maintained if the shear rate is applied to the molten polymer for a period of one hour or longer. This property is important to allow the molten polymer to be maintained in a molten state under shear in conventional equipment prior to extrusion onto a cellulosic substrate. This enables commercial manufacture over normal processing times. The homopolymer polyvinyl alcohol having a high degree (HD) of hydrolysis may be used in high performance applications, not available using previously known polyvinyl alcohol polymer coatings.

In embodiments, the viscosity of the molten polymer under steady state conditions decreases at shear rates up to 1,000 l/s or higher.

In embodiments, a reduced viscosity is attained when shear is applied to the molten polymer, the reduced viscosity being maintained if the shear is applied for a prolonged period, for example, up to one hour.

In embodiments, the viscosity of the molten polymer decreases with increasing shear rate from a viscosity at a shear rate of 800 l/s to a viscosity at a shear rate of 1000 l/s, the viscosities being measured at a steady state following application of shear for up to one hour.

The molten polymeric material may be pseudoplastic or display shear thinning behaviour that fits to the Carreau-WLF viscosity model with an accuracy better than 97%.

The application of the molten polyvinyl alcohol film directly to the substrate has the advantage that it is not necessary to use a two-stage process wherein the film is solidified to form a solid film which is subsequently applied to the substrate using an adhesive. Use of an adhesive is undesirable because in addition to the added cost, it can contaminate a water stream during recycling, for example in a paper mill.

In embodiments, the melting point of the polyvinyl alcohol polymer may be from about 190° C. to about 210° C., for example, from about 195° C. to about 205° C., for example, about 200° C.

The polyvinyl alcohol is preferably a homopolymer and may be formed by hydrolysis of polyvinyl acetate homopolymer. The polyvinyl alcohol may have a high degree (HD) of hydrolysis of 90 wt % or greater, for example 93 wt % or greater, 95 wt % or greater or 98 wt % or greater. A preferred degree of hydrolysis is in the range 93 wt % to 96 wt %.

Use of a polyvinyl alcohol homopolymer is particularly advantageous. The coating applied to the substrate may exhibit high clarity, high tensile strength and superior barrier properties in relation to oils, greases and fats. Superior barrier properties to oxygen may also be achieved.

Polyvinyl alcohol having a high degree of hydrolysis is difficult to process by previously known methods.

The polyvinyl alcohol may be a blend of higher and lower molecular weight of polyvinyl alcohols, preferably having the same degree of hydrolysis.

The polyvinyl alcohol polymer may include one or more plasticisers. The plasticisers may be selected from the group consisting of: polyhydric alcohols, polyethylene glycols, glycerol, diols or triols, for example, propylene glycol, ethylene glycol, polyethylene glycol, glycerol, mannitol erythritol, pentaerythritol sorbitol, trimethylolpropane and mixtures thereof.

Exemplary plasticisers may be selected from the following compounds and mixtures thereof:
(a) sugar alcohols selected from the group consisting of: diglycerol, triglycerol, fructose, ribose, xylose, D-mannitol, triacetin, and mixtures thereof,
(b) polyols selected from the group consisting of: pentaerythritol, dipentaerythritol, and mixtures thereof;
(c) diols selected from the group consisting of: methyl pentanediol, 1,2-propanediol, 1,4-butanediol, 2-hydroxy-1,3-propanediol, 3-methyl-1,3-butanediol, 3,3-dimethyl-1,2-butanediol, and mixtures thereof;
(d) glycols selected from the group consisting of: polyethylene glycol 300, polyethylene glycol 400, alkoxylated polyethylene glycol, and mixtures thereof, (e) caprolactam, cyclic trimethylolpropane formal, rosin esters, euricamide, and mixtures thereof.

The water content of the molten polymer may be less than 0.5% w/w, for example, less than 0.1% w/w.

The cellulosic substrate may be paper, board or card. Cellulosic substrates comprise cellulose fibres.

The method of the present invention arises from the discovery that the molten polyvinyl alcohol film has inherent adhesive properties when coated onto a cellulosic substrate. In contrast, solidified polyvinyl alcohol films used in the prior art processes do not exhibit such inherently advantageous adhesive properties, making use of an additional adhesive necessary. However, an additional adhesive will contaminate the water stream in a paper recycling mill.

The polyvinyl alcohol coating of this invention may adhere strongly to cellulosic substrates, providing improved mechanical properties, including flexibility and resistance to delamination.

The molten polyvinyl alcohol film may be applied to the substrate using standard equipment, for example, as used for coating polyethylene onto substrates. The use of specialised equipment is avoided. This was not previously possible with HD polyvinyl alcohol.

A particular advantage is that the polyvinyl alcohol coated paper, board or other cellulosic material of this invention may be recycled in a conventional paper mill. During recycling in a paper mill the cellulose fibres need to be released from the composite product. The HD polyvinyl alcohol may be selected so that it is dissolvable in cold water but dissolves in water at a temperature, for example about 60° C. used for processing of recycled paper and card. The polyvinyl alcohol may be separated by precipitation from a water stream, allowing recovery for reprocessing and further use.

Polyvinyl alcohol polymers of this invention preferably do not include starch, dextrin or other polysaccharides.

Previously, paper and board have been coated with polyethylene, preventing recycling of the polymer and creating difficulties for recycling of the cellulosic material in a paper mill. The coated material of the present invention has better barrier properties than previously known polyethylene coated cellulosic materials. Greater mechanical strength and resilience may be achieved.

According to an aspect of the present invention a coated material comprises:
a cellulosic substrate; and
a coating of polyvinyl alcohol polymer applied directly to the substrate in the absence of an adhesive;
wherein the polyvinyl alcohol polymer may dissolve within 10 minutes in water having a temperature from about 30° C. to about 60° C. to allow release of 100% cellulose fibres from the coated substrate.

The polymer may be a plasticised polyvinyl alcohol homopolymer having a high degree (HD) of hydrolysis as disclosed in accordance with the first aspect of this invention.

The water temperature may be about 35° C. to about 45° C. for example about 40° C. An excess of water may be employed. The substrate and polymer may be comminuted prior to dissolution.

Solubility of the polyvinyl alcohol coating in water at a temperature of about 30° C. to about 60° C., preferably about 35° C. to about 45° C., for example, about 40° C., allows the coated material to be recycled in a paper mill operating at that temperature, without a risk of clogging due to the presence of insoluble polymeric material.

This allows a conventional recycling plant to be used without modification, for example to include filtration or separation equipment for removal of insoluble polymeric material. The polyvinyl alcohol may be recovered, for example using the process disclosed in WO2016/046520.

Extrusion coatings of this invention may be applied using equipment manufactured for example by Davis Standard, SAM, DaeKang or Bandera.

A wide range of papers, paper boards and fibre boards may be used. Offset or printed paper, coated paper, tissue paper, news print, cardboard, paperboard, fine art paper, craft paper, acid-free paper and cellophane.

The plasticised polyvinyl alcohol coating may be applied to cellulose films, for example, cellulose acetate films made by Celanese Corp. The coating may also be applied to precipitated cellulose, for example Natureflex manufactured by Futamura Corp.

The extrudable compositions and films of the present invention have unexpectedly been found to provide superior properties in comparison to previously used stock polyvinyl alcohol material which had been made by precipitation, flocculation from solution or deposited from an emulsion.

An advantage of this invention is that low grade paper, for example news print may be used, although high grade printing and craft papers may also be employed, particularly for high end cosmetic and food packaging applications, including applications for which recycling has previously not been possible.

It is an advantage of the present invention that low-grade paper which is lower in cost, may be used for applications such as sandwich or food packaging, magazine wrappers and paper sacks, for example, for pet food and other products which have high grease or fat levels which have consequently been difficult to recycle.

Paper or other cellulosic materials coated in accordance with the present invention exhibit higher strength and resistance to tearing, facilitating use with conventional high-speed production apparatus.

Coated paper, board or other cellulosic materials of this invention may be processed using conventional production, manufacturing lines or other equipment constructed for handling polyolefin or other polymer sheet materials, for example form, fill and seal production lines. Conventional polymer sheet production lines operate at much higher speeds, e.g. 200-800 m/min, than is possible with paper, sheet or board materials. Hitherto it had not been possible to run paper on a commercial form, fill and seal line. Paper is prone to tearing under high-speed processing conditions. Coated papers of this invention can be run on high-speed lines such as are used for polyolefin coated sheet materials.

Coating of paper in accordance with the present invention may provide superior moisture and lipid resistance, for example for manufacture of packaging for oily products for example fatty foodstuffs, for example pet food. It has unexpectedly been found that a coated paper in accordance with the present invention having half the coating weight in comparison with conventional polyethylene coated paper may exhibit up to six times the strength of the conventional material.

Coated paper composites of the present invention provide superior properties in comparison to paper which has been sized using a polyvinyl alcohol solution.

Multiple layers may be employed, for example a layer of the polyvinyl alcohol coating may be applied between two layers of paper or other cellulosic material. Such multilayer laminates have good oil, grease and fat barrier properties and may be used for manufacture of paper plates, boxes, trays and similar products.

The coated paper composites may be used for manufacture of hot water soluble bags or films for wrapping, containing or protection for a variety of applications, including cytotoxic bags, electrostatic discharge (ESD) bags; anaerobic digestible (AD) bags and garment bags. Bags or other films in accordance with this invention have the advantage that organic waste may be transported to anaerobic digester plants without need for removal of the waste from the bags prior to processing. Such bags avoid the need to clean out green, recycling bins.

The bags of the present invention may be used for many applications for which starch-based bags are not suitable. Starch-based bags are weaker, having lower tensile strength and inferior barrier properties in comparison to bags made in accordance with this invention.

The polymer composition may be manufactured using the process disclosed in EP20184345 or WO2017/046361, the disclosures of which are incorporated into this specification by reference for all purposes.

An exemplary method for the manufacture of a plasticised polyvinyl alcohol polymer mixture, comprises the steps of:

introducing a polyvinyl alcohol polymer comprising polyvinyl alcohol or a blend thereof having a degree of hydrolysis in the range of 93 wt % to 98 wt % into a mixing reactor;

wherein the mixing reactor comprises a blending chamber having a primary inlet, a primary outlet and at least two inter-engaging components extending between the primary inlet and primary outlet, the components being arranged to apply a shearing force to the polymer while the polymer is conveyed by the components from the inlet through a reaction zone to the outlet;

one or more secondary inlets located downstream from the primary inlet for introducing reactants comprising a processing aid and a plasticiser to the chamber to form a reaction mixture;

wherein the blending chamber comprises a plurality of heated regions arranged so that the mixture is subjected to a temperature profile whereby the temperature increases from the inlet to the outlet;

a secondary outlet located between the reaction zone and primary outlet arranged to allow removal of processing aid from the chamber;

reacting the processing agent, plasticiser and polymer in the reaction zone to form plasticised polymer; and allowing the plasticised polymer mixture to pass from the primary outlet.

Use of a reactive mixer allows the processing aid and plasticiser to be reacted with the polyvinyl alcohol or blend thereof, followed by removal of all or most of the processing aid from the secondary outlet to give plasticised polyvinyl alcohol or a blend thereof.

The total amount of the plasticiser or plasticisers may be up to 10 wt %.

A blend of two or more polyvinyl alcohol polymers may be employed, for example a blend of two polyvinyl alcohol polymers with the same HD value and a high molecular weight and a low molecular weight respectively.

For example, a blend may comprise a low viscosity grade having a molecular weight in the range 13,000 to 27,000 and a degree of polymerisation of 300 to 600 and a medium to high viscosity grade having a molecular weight in the range 107,000 to 120,000 and a degree of polymerisation of 2,400 to 2,600.

Use of a blend may allow control of the viscosity of the polymer. Selection of stabilisers as disclosed in this specification allows use of blends of a desired viscosity without a loss of other properties. Alternatively, use of a blend may permit use of polyvinyl alcohol with one or more stabilisers while maintaining viscosity or other properties to permit manufacture of pellets or films.

In particularly advantageous embodiments, the polyvinyl alcohol consists of a blend of two or more polyvinyl alcohol polymers each having a degree of hydrolysis of 93% to 98%, preferably one with a high molecular weight and at least one low molecular weight polyvinyl alcohol. In a preferred embodiment, the polymer comprises 80% high molecular weight polyvinyl alcohol and 20% low molecular weight polyvinyl alcohol. The ratio of high to low molecular weight molecular polyvinyl alcohol may be 2:1 to 10:1, preferably 3:1 to 7:1, more preferably 6:1 to 4:1, most preferably about 5:1.

The high molecular weight polymer may have a molecular weight of 60000 to 120000.

The lower molecular weight polymer may have a molecular weight of 5000 to 30000.

The blends of different molecular weight polymers employed are selected in accordance with the physical properties required in the finished product. These may require different molecular weight materials being used. Use of more than two different molecular weight polymers may be advantageous. The use of a single molecular weight polymer is not precluded.

One or more reactive stabilisers may be included in the polymer composition. Exemplary reactive stabilisers may be selected from the group consisting of: calcium stearate, stearic acid, sodium stearate, potassium oleate, potassium sorbate, sodium benzoate and mixtures thereof. An amount of less than 1 wt % may be used.

Use of one or more reactive stabilisers may result in an advantageous reduction in the extent of degradation during melt processing. Sodium benzoate has been found to be particularly effective.

Further additives may be used, including antioxidants, dyes and pigments.

Repulpability of cellulosic substrates such as paperboard coated with polyvinyl alcohol may be determined and compared with paperboard coated with polyethylene using Italian National Recyclability Standard: UNI11743 Paper and Board: Determination of Recyclability of Cellulose-Based Materials and Products.

Macrostickies may be determined by British Standard ISO15360. Stickies are a diverse group of materials that are retained on a laboratory screen of a given slot aperture and which adhere to objects which they touch. Stickies may adhere to objects at ambient temperature or they may adopt adhesive characteristics when subjected to elevated temperatures, elevated pressure or a change in pH.

In this specification percentages or other amounts are by weight unless indicated otherwise. Amounts are selected from any ranges given to total 100%

BRIEF DESCRIPTION OF THE DRAWINGS

This invention is further described by means of example but not in any limitative sense with reference to the accompanying drawing, of which.

DETAILED DESCRIPTION

Example 1—Polymer Compositions

Figure 1:
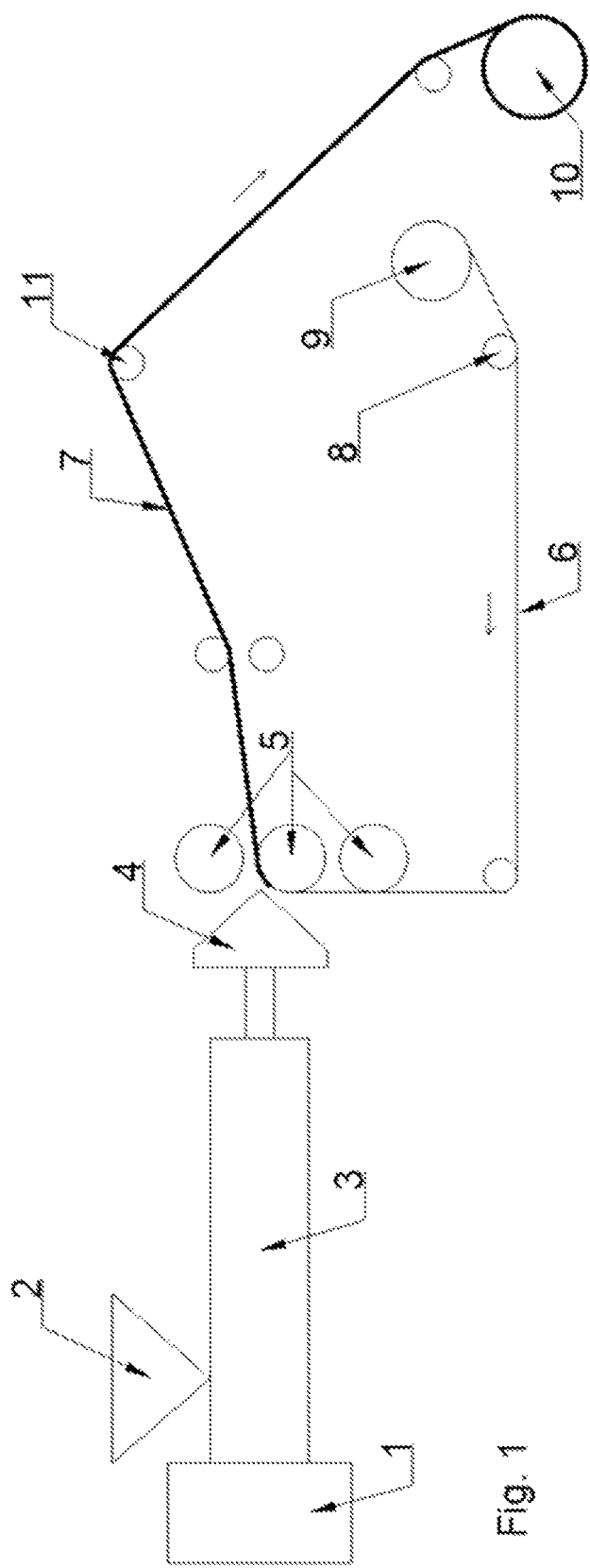
FIG. 1 is a schematic diagram of an extrusion-coated apparatus in accordance with this invention.

The formulation used in an extrusion coating run comprised a blend of two polyvinyl alcohol (PVOH) polymers having different degrees of hydrolysis and viscosity.

PVOH grade 1-14.31% (HD 91-93 wt % with viscosity in 4 wt % water solution at 20° C. of 14.5-19.5 cP)
PVOH grade 2-57.26% (HD 87-89 wt % with viscosity in 4 wt % water solution at 20° C. of 3.5-4.5 cP)
The composition was:
dipentaerythritol 6-9%, preferably 7.5%;
caprolactam 2-3%, preferably 2.5%;
sodium benzoate 0.25%;
polyvinyl alcohol balance to 100%.

The extruder used to prepare the polymer formulation was a Zeppelin RHC 25 twin screw extruder with L:D 56:1; vented at zones 7 and 10. The gross feed rate to the extruder was 5.0 Kg/h and the torque generated was 19+/−4.0%. The extruder was fitted with a strand pelletizer at the die exit. The extrusion temperature profile settings were as follows:

| zone | 0 | 1 | 2 | 3 | 4 | 5 | 6 | 7 | 8 | 9 | 10 | 11 | Die |
|---|---|---|---|---|---|---|---|---|---|---|---|---|---|
| Temp. (° C.) | x | 10 | 10 | 75 | 200 | 235 | 250 | 250 | 250 | 230 | 230 | 225 | 225 |

Samples of the pellets produced from the run were characterised by DSC, TGA, capillary rheometry and other laboratory methods. A key test was that the pellets produced good coatings using standard commercial extrusion coating methods.

The viscosity of the polymeric material was determined on a Dynisco LRC 7000 Series capillary rheometer at three temperatures and different shear rates. The polymer was allowed to equilibrate for 1 hour to reach a steady state at the specified shear rate before the viscosity was measured.

TABLE 1

| | Viscosity range | | |
|---|---|---|---|
| Shear rate ($\gamma$ [1/s]) | Viscosity ($\eta$ [Pa · s]) @200° C. | Viscosity ($\eta$ [Pa · s]) @210° C. | Viscosity ($\eta$ [Pa · s]) @220° C. |
| 80 | 500-900 | 300-700 | 200-600 |
| 150 | 300-800 | 200-600 | 100-500 |
| 250 | 250-700 | 150-500 | 80-450 |
| 400 | 200-500 | 100-400 | 70-400 |
| 650 | 150-400 | 90-300 | 60-300 |
| 1000 | 90-350 | 70-250 | 50-250 |
| 3000 | 60-200 | 40-200 | 30-150 |
| 5000 | 40-150 | 30-150 | 20-100 |
| 8000 | 10-100 | 10-100 | 10-80 |

TABLE 2

| | Viscosity range | | |
|---|---|---|---|
| Shear rate ($\gamma$ [1/s]) | Viscosity ($\eta$ [Pa · s]) @200° C. | Viscosity ($\eta$ [Pa · s]) @210° C. | Viscosity ($\eta$ [Pa · s]) @220° C. |
| 80 | 700 | 500 | 380 |
| 150 | 550 | 400 | 300 |
| 250 | 450 | 350 | 250 |
| 400 | 350 | 250 | 200 |
| 650 | 250 | 200 | 150 |
| 1000 | 200 | 150 | 120 |
| 3000 | 100 | 80 | 70 |
| 5000 | 70 | 60 | 50 |
| 8000 | 50 | 45 | 35 |

Example 2—Properties of the Molten Polymer

Melt strength testing of the polyvinyl alcohol polymer was performed on a RHEOTENS 71.97 extensional rheometer in combination with a Goettfert Rheograph 20 Model Capillary Rheometer using a 2000 bar transducer. The material equilibrated in the test barrel for 2 minutes before testing started.

Testing was performed at 210° C. using a 30 mm long die and 2 mm diameter, and entrance angle of 180° C.

TABLE 3

| Melt strength test results | | | |
|---|---|---|---|
| Speed at Break, Vb (mm/s) | Force at Break, F (N) | Draw Ratio at Break (λ) | Elongation Stress at Break, σ (MPa) |
| 267.87 | 0.0266 | 7.195 | 0.13473 |

Example 3—Coating of the Substrate

The apparatus shown in FIG. 1 comprises a drive unit (1) arranged to drive a single screw extruder, the screw having a diameter of 25 mm and a length/diameter (L/D) ratio of 30. A gravity feed hopper (2) serves as an inlet into the extruder of pellets of the polyvinyl alcohol feed stock. A slot die (4) provides a 200 mm wide film of molten polymer. A web path is provided by rolls (5) to support the cellulosic substrate during application of the polyvinyl alcohol coating. Uncoated substrate (6) is supplied from the unwound roll (9) and passes over an idler roll (8) to a nip roll assembly (5) at the coating station. The coated substrate (7) passes over an idler roll (11) to rewind roll (10).

Figure 2:
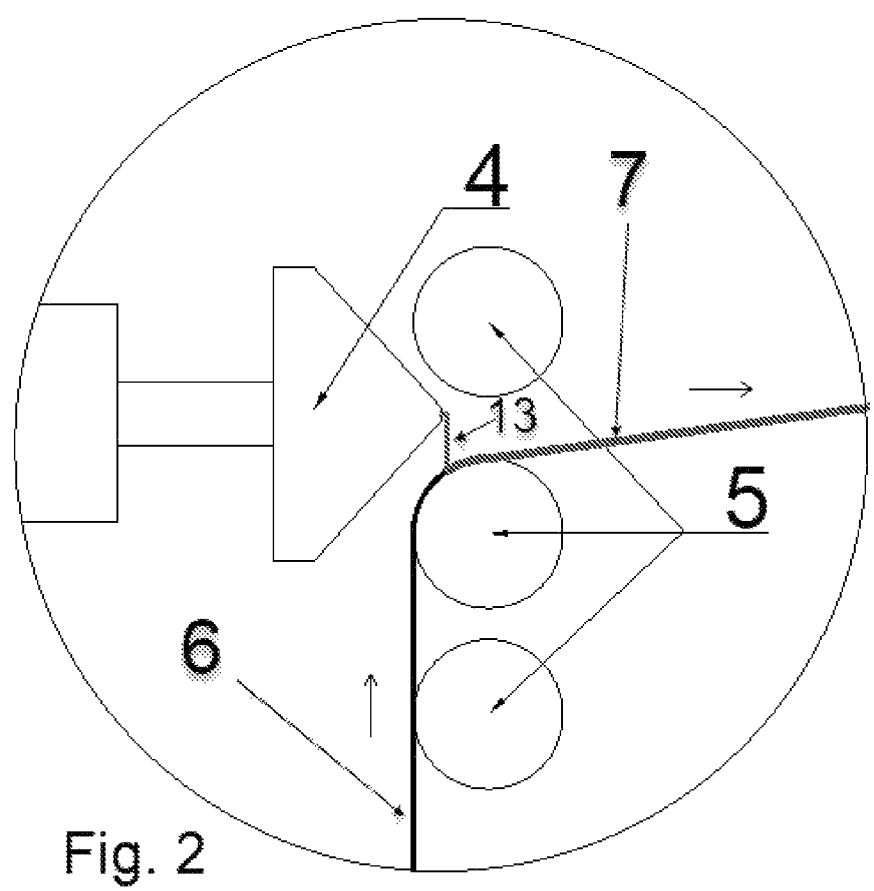
FIG. 2 is a schematic diagram showing details of the extrusion head.

FIG. 2 is an enlarged partial view showing detail of the extrusion head (4) and nip roll assembly (5). Uncoated substrate (12) passes over the middle roll beneath the slot of die (4). A curtain of molten polyvinyl alcohol polymer (13) passes vertically from the die into contact with the surface of the substrate to form a coated substrate (7). The temperature of the molten polymer (13) when it leaves the die may be in the range 180° C. to 225° C. and the temperature of the polymer when it contacts the substrate (6) is greater than 70° C.

The extruder barrel (3) has five heated zones and a heated adapter nozzle where polymer is transported due to back pressure from the screw into the back of the coating dye.

The extruder temperature profile was as follows:

| Zone 1 (inlet) | Zone 2 | Zone 3 | Zone 4 | Zone 5 |
|---|---|---|---|---|
| 70° C. | 150° C. | 185° C. | 190° C. | 200° C. |

The coating die has 4 heated zones, top, bottom and sides, with the following temperature settings:

| top | bottom | sides |
|---|---|---|
| 205° C. | 205° C. | 210° C. |

The cellulosic substrate was a clay coated kraft paper having a basis weight of 45 g/m². The paper was coated with a layer of polyvinyl alcohol polymer composition as described in example 2, having a basis weight of 20 g/m². The temperature of the polymer melt was 202° C., the rotational screw speed was 30 rpm and the pressure was 5,000 to 8,000 kPa (50 to 80 bar). The line speed was set to 10 m/min.

Polymer pellets were fed into the extruder via the gravity fed hopper. The polymer material was fed directly into the screw and was transported along the length of the barrel where it was subjected to heat and pressure to form molten polymer.

The molten polyvinyl alcohol was then forced by the extruder screw through the narrow slit of the extrusion coating die. The slit is linear. The melt emerged as a thin molten film.

A variety of coating dies with different internal geometries may be used. The die used in this example has a so called "coat hanger" geometry. The coat hanger name refers to the internal shape of the flow path which allows polymer to enter from a single point and is then distributed evenly along the width of the die. The shape and profile of the die varies in depth so as to maintain an even parallel flow of material.

The thickness of the molten polymer resin was drawn down from the die gap thickness of (details) to the coating thickness of (detail) by the nip roll assembly.

At the point of coating, the polymer was dropped vertically into a nip point between a chill roll and a backing or pressure roll. The paper substrate was fed over the backing roll and around the underside of the chill roll. When the polymer contacts the paper, it was bonded through heat and pressure applied by the nip. The chill roll ensured crystallisation of the polymer so that it would not stick to any rolls or to itself once on the rewind roll where the composite polyvinyl alcohol coated paper was collected.

Example 4—Solubility Test

The solubility of a film or coating of a polyvinyl alcohol composition may be determined by the following method.

A glass beaker was set up on a stirred hot plate with a calibrated thermometer.

Six slide frames were split into upper and lower faces. One was used as a template to cut six replicate samples from a sample of polymer composition film having a thickness of 25-30 microns. The sample was sealed between the upper and lower slide frames and the frames were snapped closed.

Water (400 g) was placed in the beaker with a magnetic stirrer bar and placed on the hot plate. The stirrer rate was adjusted to give a vortex of 80% and the water was heated to the required temperature.

The framed sample was clamped and placed in the heated water and a timer was started. The time of breakdown of the film was recorded.

The framed film sample was left in the water until the film had completely dissolved and there were no remaining visible particles. The time was recorded.

The measurement was repeated with two other replicate samples and fresh water.

For measuring the time and temperate at which the film is no longer soluble, a framed film sample was clamped below the water line and any changes in the structure of the film were observed. The time of any film breakdown was recorded.

The measurement was repeated with two replicate samples and fresh water.

What is claimed is:

1. A method of manufacture of a coated material comprising the steps of:
   providing a cellulosic substrate;
   melting a polyvinyl alcohol polymer which includes one or more plasticizers, wherein the polyvinyl alcohol polymer is a blend of two or more homopolymeric polymer grades having low and high respective molecular weights;
   each homopolymeric polymer has a degree of hydrolysis of 90 wt % or greater and a melting point in the range of 200° C. to 225° C.;

extruding the melted polyvinyl alcohol polymer to form a molten polyvinyl alcohol polymeric film;

applying the molten polyvinyl alcohol polymeric film directly to the surface of the substrate; and allowing the molten polyvinyl alcohol polymeric film to solidify on the surface to form a coated material.

2. The method of claim 1, wherein the molten polyvinyl alcohol polymeric film is applied directly to the surface of the substrate without use of an adhesive or intermediate bonding layer.

3. The method of claim 1, wherein the polyvinyl alcohol polymer is formed by hydrolysis of polyvinyl acetate homopolymer.

4. The method of claim 1, wherein the polyvinyl alcohol polymer has a degree of hydrolysis of 93 wt % or greater.

5. The method of claim 4, wherein the degree of hydrolysis is in the range of 93 wt % to 96 wt %.

6. The method of claim 1, wherein the one or more plasticizers are selected from the following plasticizers and mixtures thereof:
(a) sugar alcohols selected from the group consisting of: diglycerol, triglycerol, fructose, ribose, xylose, D-mannitol, triacetin, and mixtures thereof;
(b) polyols selected from the group consisting of: pentaerythritol, dipentaerythritol, and mixtures thereof;
(c) diols selected from the group consisting of: methyl pentanediol, 1,2-propanediol, 1,4-butanediol, 2-hydroxy-1,3-propanediol, 3-methyl-1,3-butanediol, 3,3-dimethyl-,2-butanediol, and mixtures thereof;
(d) glycols selected from the group consisting of: polyethylene glycol 300, polyethylene glycol 400, alkoxylated polyethylene glycol, and mixtures thereof; and
(e) caprolactam, cyclic trimethylolpropane formal, rosin esters, euricamide, and mixtures thereof.

7. The method of claim 1, wherein the cellulosic substrate is paper, board or card.

8. The method of claim 1, wherein the blend comprises a first grade having a molecular weight in the range of 13,000 to 27,000 and a degree of polymerization of 300 to 600 and a second grade having a molecular weight in the range of 107,000 to 120,000 and a degree of polymerization of 2,400 to 2,600.

9. The method of claim 1, wherein the polyvinyl alcohol polymer includes one or more reactive stabilizers selected from the group consisting of:
calcium stearate, stearic acid, sodium stearate, potassium oleate, potassium sorbate, sodium benzoate and mixtures thereof.

10. The method of claim 1, wherein a reduced viscosity is maintained when shear is applied to the molten polyvinyl alcohol polymer, the reduced viscosity being maintained if the shear is applied for a period up to one hour or longer.

11. The method of claim 1, wherein the viscosity of the molten polyvinyl alcohol polymer decreases with increasing shear rate from a viscosity at a shear rate of 80l/s to a viscosity at a shear rate of 1000l/s, the viscosities being measured at steady states following application of shear to the molten polyvinyl alcohol polymer for up to one hour.

12. The method of claim 1, wherein the polyvinyl alcohol polymer is pseudoplastic.

13. The method of claim 1, wherein the polyvinyl alcohol polymer has a degree of hydrolysis of 95 wt % or greater.

14. The method of claim 8, wherein the two or more polyvinyl alcohol polymer grades have the same hydrolysis degree (HD) value.

15. The method of claim 1, wherein the one or more plasticizers are diglycerol, triglycerol, xylose, D-mannitol, triacetin, dipentaerythritol, 1,4-butanediol, 3,3-dimethyl-,2-butanediol, caprolactam and mixtures thereof.

16. The method of claim 1, wherein the polyvinyl alcohol polymer dissolves in 10 minutes in water having a temperature from about 30° C. to about 60° C. and 100% of the undissolved cellulose fibers are released from the coated material.

17. The method of claim 16, wherein the coated material is processable in a conventional paper mill.

18. The method of claim 9, wherein the polyvinyl alcohol polymer includes sodium benzoate.

* * * * *